United States Patent
Westort et al.

(10) Patent No.: US 6,598,976 B2
(45) Date of Patent: Jul. 29, 2003

(54) METHOD AND APPARATUS FOR IMAGE ENHANCEMENT AND ABERRATION CORRECTIONS IN A SMALL REAL IMAGE PROJECTION SYSTEM, USING AN OFF-AXIS REFLECTOR, NEUTRAL DENSITY WINDOW, AND AN ASPHERIC CORRECTED SURFACE OF REVOLUTION

(75) Inventors: Kenneth S. Westort, Ithaca, NY (US); Douglas L. Robinson, Ithaca, NY (US)

(73) Assignee: Optical Products Development Corp., Elmira, NY (US)

(*) Notice: Subject to any disclaimer, the term of this patent is extended or adjusted under 35 U.S.C. 154(b) by 0 days.

(21) Appl. No.: 09/946,183

(22) Filed: Sep. 5, 2001

(65) Prior Publication Data

US 2003/0043345 A1 Mar. 6, 2003

(51) Int. Cl.⁷ .................. G03B 21/26; G03B 21/14; G03B 27/14
(52) U.S. Cl. ................ 353/28; 353/20; 359/630
(58) Field of Search .............. 359/13, 630, 631, 359/632; 349/5, 74; 353/20, 21, 28, 29, 39, 121, 122

(56) References Cited

U.S. PATENT DOCUMENTS

| | | | |
|---|---|---|---|
| 3,647,284 A | 3/1972 | Elings et al. | 350/294 |
| RE27,356 E | 5/1972 | LaRussa | 350/157 |
| 4,093,347 A | 6/1978 | LaRussa | 350/174 |
| 4,112,462 A * | 9/1978 | Mecklenborg | 348/121 |
| 4,653,875 A | 3/1987 | Hines | 350/442 |
| 4,721,380 A * | 1/1988 | Gryglas | 353/119 |
| 4,802,750 A | 2/1989 | Welck | 350/619 |
| 4,810,092 A * | 3/1989 | Auth | 356/244 |
| 4,850,152 A * | 7/1989 | Heynacher et al. | 451/166 |
| 5,257,130 A | 10/1993 | Monroe | 359/478 |
| 5,268,775 A | 12/1993 | Zeidler | 359/40 |
| 5,291,897 A | 3/1994 | Gastrin et al. | 128/716 |
| 5,305,124 A | 4/1994 | Chern et al. | 359/13 |
| 5,311,357 A | 5/1994 | Summer et al. | 359/479 |
| 5,369,450 A * | 11/1994 | Haseltine et al. | 315/368.12 |
| 5,380,999 A * | 1/1995 | Prakash et al. | 250/216 |
| 5,486,840 A | 1/1996 | Borrego et al. | 345/7 |
| 5,539,578 A * | 7/1996 | Togino et al. | 345/7 |
| 5,576,887 A * | 11/1996 | Ferrin et al. | 345/7 |
| 5,585,946 A | 12/1996 | Chern | 349/5 |
| 5,596,451 A | 1/1997 | Handschy et al. | 359/633 |
| 5,606,458 A | 2/1997 | Fergason | 359/630 |
| 5,621,572 A | 4/1997 | Fergason | 359/630 |
| 5,831,712 A | 11/1998 | Tabata et al. | 351/158 |
| 5,886,818 A | 3/1999 | Summer et al. | 359/478 |
| 6,163,408 A | 12/2000 | LaRussa | 359/630 |
| 6,262,849 B1 * | 7/2001 | Potin et al. | 359/631 |
| 6,318,868 B1 | 11/2001 | LaRussa | 359/857 |

FOREIGN PATENT DOCUMENTS

| | | | |
|---|---|---|---|
| JP | 07 043634 | 2/1995 | G02B/27/02 |
| JP | 08 152579 | 6/1996 | G02B/27/28 |
| WO | WO 00/65844 | 11/2000 | H04N/9/30 |

OTHER PUBLICATIONS

Jenkins, Francis A and White, Harvey E. "Fundamentals of Optics". McGraw–Hill Publishing Company Ltd. 1937.

* cited by examiner

Primary Examiner—Russell Adams
Assistant Examiner—Andrew Sever
(74) Attorney, Agent, or Firm—Brown & Michaels, PC

(57) ABSTRACT

A real image projection system comprises a single curved mirror having two different optical surfaces of revolution, one on the convex surface and one on the concave surface. In one embodiment, the convex surface is a conical curve of spherical or parabolic surface of revolution, coated with a reflective optical coating. The concave surface is much like that of a Mangin mirror, but it has an aspheric surface of revolution, optimized to reduce spherical aberrations over a larger area offset from the optical axis. The system optionally employs a single aspheric surface of revolution on the concave surface for reduction of aberrations, although the Mangin mirror approach, using an aspheric concave surface of revolution, is the preferred embodiment.

1 Claim, 23 Drawing Sheets

TARGET OBJECT

REAL IMAGE
(FIELD CURVATURE DISTORTION)

TARGET OBJECT
CRT WITH PIN-CUSHION

REAL IMAGE WITH
FIELD CURVATURE
DISTORTION

EXAMPLE SHOWN:
COATING TRANSMISSION = 40%
COATING REFLECTIVITY = 60%
NEUTRAL DENSITY ABSORPTION = 20%

EXAMPLE SHOWN:
COATING TRANSMISSION = 40%
COATING REFLECTIVITY = 60%
NEUTRAL DENSITY ABSORPTION = 20%

FIGURE 19

| BEAMSPLITTER CHARACTERISTICS | | | Image % | Ghost % | Ghost / Image Ratio |
|---|---|---|---|---|---|
| Absorption % | Transmission % | Reflectivity % | | | |
| 30% | 40% | 60% | 14.28% | 6.66% | 46.67% |
| 35% | 40% | 60% | 13.26% | 5.75% | 43.33% |
| 25% | 35% | 65% | 14.50% | 5.86% | 40.38% |
| 30% | 35% | 65% | 13.54% | 5.10% | 37.69% |
| 35% | 35% | 65% | 12.57% | 4.40% | 35.00% |
| 40% | 35% | 65% | 11.60% | 3.75% | 32.31% |
| 45% | 35% | 65% | 10.64% | 3.15% | 29.62% |

METHOD AND APPARATUS FOR IMAGE ENHANCEMENT AND ABERRATION CORRECTIONS IN A SMALL REAL IMAGE PROJECTION SYSTEM, USING AN OFF-AXIS REFLECTOR, NEUTRAL DENSITY WINDOW, AND AN ASPHERIC CORRECTED SURFACE OF REVOLUTION

BACKGROUND OF THE INVENTION

1. Field of the Invention

The invention pertains to the field of small optical display systems. More particularly, the invention pertains to apparatus and methods for enhancement of a real image projection system through the use of several combinations of methods of aberration reduction. The primary enhancement is reduced ghosting and reduction of astigmatism, common with small real image systems wherein the viewing distance is relatively close.

2. Description of Related Art

The present invention pertains to a real image projection system, and in particular, to a system in which an image of a real object is formed in space, giving the illusion that a real object exists at that point in space, when in reality it does not. Real image projection systems normally incorporate spherical or parabolic mirrors for imaging. In large systems, where the viewer is located at a significant distance from the image being viewed, optical aberrations, such as, for example, spherical aberrations, and astigmatism in particular, are not as much of a problem as in smaller systems, where the viewer is located close to the image. Astigmatism causes eye strain when viewing the image for long periods of time, and this has been one of the primary reasons that small real image projection systems have not been widely incorporated in gaming applications, as well as in workstation applications.

Another reason for the lack of wide-spread acceptance of small real imaging systems is that ghost images in the systems are much more noticeable, when viewing the display from a close distance. Many approaches have been used to reduce ghosting, including tinted beamsplitters and circular polarizers, none of which are extremely effective. Even with the use of a circular polarizing window, the ghost images are visible, although they can be significantly reduced. The circular polarizing windows typically have a maximum transmission of 42%, and this significantly reduces image brightness. Thus, in an arcade or other public area that is brightly lit, the real image usually is difficult to see.

Other optical aberrations present problems for real image projection systems. For example, field curvature distortion is a significant problem for smaller systems, because of the shorter focal lengths typically associated with small systems. For example, a rectangular shape displayed on a CRT screen projects as a "fish-eyed" real image of the target object. The sides of the rectangular image appear to bow outward and the center of the rectangular image appears magnified, as compared to the edges. This is a natural phenomenon of spherical mirrors, and cannot normally be corrected without a significant number of additional lenses in the beam-path, which makes the display system significantly larger in physical size, as well as making the cost of manufacturing such displays prohibitive.

Optics have been designed to compensate for some of these aberrations, such as, for example, spherical aberrations, through use of the Mangin mirror. This is a mirror that has a reflective convex spherical surface of longer radius, and a transmissive concave spherical surface of shorter radius. However, this approach is not practical for a real image projection system, because the image source or target is not a point at the focal point or center of curvature of the mirror, as in a single point imaging system. In a real image projection system, the target usually is a rectangle, such as a monitor screen, where only the center of the screen is on the axis or at the focal point of the mirror. The Mangin dual curve corrective mirror could be significantly improved by replacing the concave spherical surface with an aspheric surface of revolution, which will reduce the astigmatism for points offset from the axis of the mirror. Thus, a Mangin mirror incorporating two spherical curves is extremely effective for points along the axis of an on-axis system, but the problem of astigmatism becomes progressively worse as the target point deviates from the axis of the mirror curvature. An aspheric curve on the concave surface would optimize the correction and reduce the astigmatism for a larger area around the axis or focal point.

One other reason that small systems have not become mainstream is because of the difficulty in producing the curved optics in reasonable volume. The problem is compounded when corrective optical curvatures are incorporated.

SUMMARY OF THE INVENTION

The real image projection system of the present invention uses several combined methods of producing small displays having improved imagery and reduced ghosting over prior art systems.

The system of the present invention uses a single curved mirror having two different optical surfaces of revolution, one on the convex surface and one on the concave surface. In one embodiment, the convex surface is a conical curve of spherical or parabolic surface of revolution, coated with a reflective optical coating. The concave surface is much like that of a Mangin mirror, but it has an aspheric surface of revolution, optimized to reduce spherical aberrations over a larger area offset from the optical axis. The system optionally employs a single aspheric surface of revolution on the concave surface for reduction of aberrations, although the Mangin mirror approach, using an aspheric concave surface of revolution, is the preferred embodiment.

There are two problems in manufacturing mirrors with minimal aberrations and astigmatism. The quality of the surface of revolution must be very precise. This typically involves precision polishing of the surfaces, thus limiting the volume of such mirrors that can be produced in a given time, and creating a cost that is outside of what generally is acceptable for a commercial real image display system. Also, aspheres are extremely difficult to produce and must be hand polished to precise curves. Thus, the complexity of the aspheric optical surfaces of revolution prevents the mirror from being produced in large volume, therefore the preferred method of manufacture is injection molding.

Injection molding is a common manufacturing method for small optics, although it has not commonly been used for optics over 5 inches in diameter. Injection molding of optics up to 18 inches in diameter can be successfully accomplished through several techniques. Increasing the mold gate size by 200% over normal practice, and adding additional gates to the mold ensures uniform flow. It is also important to increase the number of venting ports for the displaced air during the injection process. Another step that is necessary is to calculate the press tonnage at 150% over the standard requirement.

The surface accuracy of the mirror is directly related to the surface accuracy of the mold. Creating a precision aspheric curve is not a simple task for an injection mold. The mold must be designed with separate inserts, or smaller steel blocks. A steel block is diamond-turned to the aspheric surface of revolution as a full parent optic or as a large bowl, whereby the optic is round and symmetrical. Diamond-turning is accomplished with a custom air-bearing lathe. The air bearings insure extremely precise accuracy, which is not possible with conventional lathes. The aspheric surface is cut with a single point diamond, and the curve accuracy is maintained using "CNC" or Computer Numeric Control. For visual optical systems, the accuracy of the curve should be held to a curvature rate change of 5 fringes per inch or 0.000055 inches (i.e., 55 millionths of an inch) surface deviation per linear inch across the entire surface of the mold. This is a much more liberal tolerance than laser optics or telescope optics would require, but still is well beyond the capabilities of convention machining. These tolerances can be held only through diamond-turning with air bearings. The machined surface of a diamond-turned curvature appears polished and requires minimum hand finishing.

Once the final curvature is cut into the steel block, the final shape of the optic is rough-cut slightly oversize with a diamond wire-saw, and, finally, the finished edge surfaces are EDM cut or "electrical discharge machined". The main mold housing is then machined to a tolerance in which the insert will fit into the housing with gaps less than that in which molten plastic will penetrate, or a nearly seamless fit.

The mirror surface must be free of stress and aberrations, thus, mounting design is extremely important. Acrylic mirrors stress and distort when held tightly in a fixture. Any mounting on the rear surface of the mirror will transmit distortion or an optical imprint to the front surface. Stress-free mounting requires that the mirror be held from the sides or edges, and the mounting tabs must be floating in a mounting slot with enough clearance so as not to flex the mirror in any way.

Field curvature distortion cannot be removed optically without incorporating several corrective lenses in the optical path. Field curvature distortion causes a target object to be projected with the appearance of a "fish-eye" lens. The center of the image appears magnified and the edges tend to bow outward. The present invention uses a unique approach to correcting for this distortion. The target image on the face of the CRT is "Pin-Cushioned" or compensated for the fish-eye distortion. This is accomplished electronically in a CRT, or by software in the case of a LCD panel input.

The primary problem with small real imaging systems is the production of unwanted ghost images, which are typical of on-axis projection systems. When a viewer looks into the aperture of a real image projection system, the viewer sees a reflection of himself upside-down, floating inside the display unit. Any source of light or reflection outside the system, which enters the window view-aperture, forms an image inside the system, which is visible to the observer. The device of the present invention uses a combination of methods to eliminate ghosting. The curved mirror is tilted off-axis to the input beam-path, preferably at an angle between 10 and 20 degrees. The optimum tilt is 15 degrees, since this totally eliminates ghosting, while keeping field curvature distortion at a minimum that can be corrected using the "pin-cushioned" input source.

In the "tilted off-axis mirror" configuration, the system of the present invention comprises a target object or real object, a beamsplitter positioned in the beam-path between the target object and a curved mirror, with the mirror being positioned off-axis to the normal beam-path axis. The beamsplitter is positioned substantially at, but not limited to, a 45-degree angle relative to the optical axis of the curved mirror. Light from the target object is directed in diverging rays, reflecting off a fold mirror, transmitting through the beamsplitter to the curved mirror. The primary beam-path axis, from the beamsplitter to the curved mirror, is at an angle non-coincident with the optical axis of the curved mirror. The light is reflected from the curved mirror in a convergent beam at a complementary angle to the primary beam-path angle, relative to the optical axis of the curved mirror. The converging beam-path then reflects off the beamsplitter and intersects, or comes to focus, at a point on the view axis, and forms a real image in space in front of the optical structure. Light entering the window aperture of the system is directed down and blocked from exiting within the viewing aperture, therefore, no ghost image is visible to the viewer.

The surface below the window aperture, inside of the system, preferably is a flat black surface. This surface is imaged at the window aperture, creating a very dark window opening, and providing extremely high contrast, when viewing the real image.

In a small real image display system, there is more chance for the viewer to move outside of the recommended view area or the "eye-box". As one looks at the system from below, at an angle looking upwards, there will be some ghosting visible. Such ghosting is reduced by using a neutral density window. A neutral density material is one that transmits or reflects an equal amount of light for all frequencies across the visible light spectrum. The optimum neutral density absorption is approximately 30%, although other absorption rates work as well, depending upon how the system is used and the required image brightness. Imaging light from the target is reduced by, for example, 30%, while light from a source outside the system passes through the neutral density window, reducing intensity by 30%, is reflected by the curved mirror, and is reduced by an additional 30% as it exits through the neutral density window, thus forming a ghost image of greatly reduced intensity. Another optional configuration is a neutral density beamsplitter, which perform the same function as the neutral density window.

Thus, in the present invention, the combination of (1) a precision, dual-curve, aspheric mirror (made possible through diamond-turning and injection molding), (2) a tilted off-axis configuration, and (3) a neutral density window or beamsplitter, provides a superior small real image projection system having a brighter image, significant ghost reduction, and significantly reduced optical aberrations and distortions, which are otherwise are common to small displays. When optional the pin-cushioned CRT input is incorporated, the system performance is improved even more. The incorporation of any or all of these improvements significantly improves the performance of small real image projection systems.

BRIEF DESCRIPTION OF THE DRAWING

FIG. 19 shows the relative ghost to image brightness ratio for various neutral density beamsplitter specifications.

DETAILED DESCRIPTION OF THE INVENTION

Figure 1:
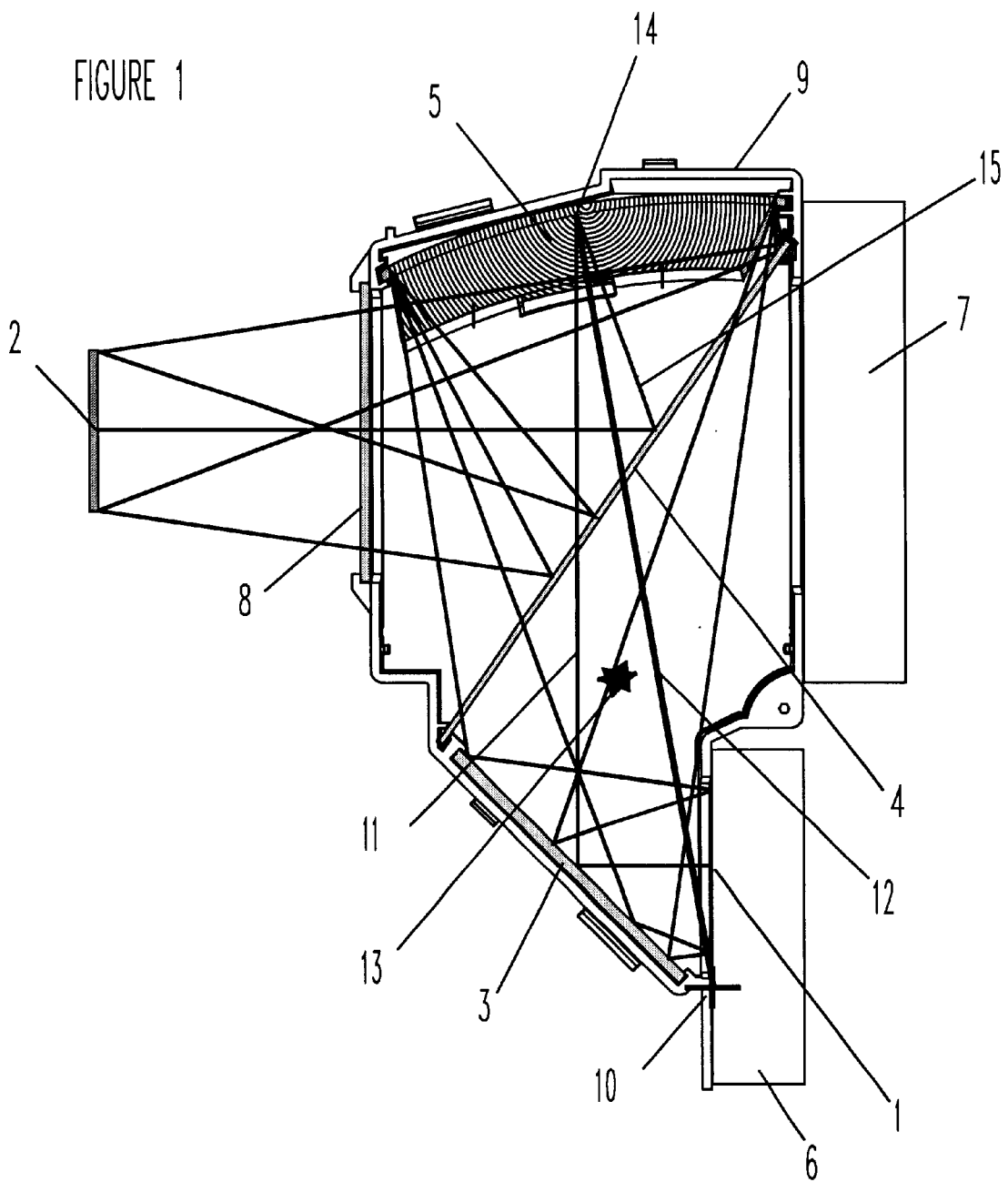
FIG. 1 shows the optical configuration and the orientation of optical components of the real image projection system of the present invention.

FIG. 1 shows an embodiment of the optical system for the micro real image display system of the present invention. The image source is a LCD or monitor (6) which emits light (1) from the screen to an optional fold mirror (3); the fold mirror is a flat reflector positioned at an angle such that light from the target source (1), located at about the center of the LCD (6), is reflected off the surface of the fold mirror (3), and directed to the physical center of the reflective surface (14) of the tilted curved mirror (5). The diverging beam of light passes through the beamsplitter (4) and strikes the reflective surface (14) of the curved reflector (5). The curved mirror is tilted to an off-axis condition; in a preferred embodiment, the optical axis (12) of the curved mirror (5) is tilted between 10 and 20 degrees (13) toward the back of the display, offset from the target axis (11) or imaging beam. An imaginary line from the center of radius (10) to the surface of the curved mirror (14) defines the optical axis (12) of the curved mirror (5). In the system shown in FIG. 1, the diverging light-beam from the target source (1) strikes the surface of the curved mirror and reflects a converging light beam (15) at a complimentary angle in relation to the optical axis (12) of the curved mirror (5). The converging light beam (15) reflects off of the beamsplitter (4) at a complimentary angle to the surface of the beamsplitter (4), and is directed to the viewing aperture (8), which, in this example, includes an optional neutral density filter glass. The light passes through the neutral density window and comes to focus at the focal point of the system (2), forming a real image in free space. The system shown in FIG. 1 also has an optional larger background LCD or monitor (7) positioned behind the beamsplitter (4), so that the background LCD screen (7) is visible as a background scene, when viewed through the window (8).

Figure 2:
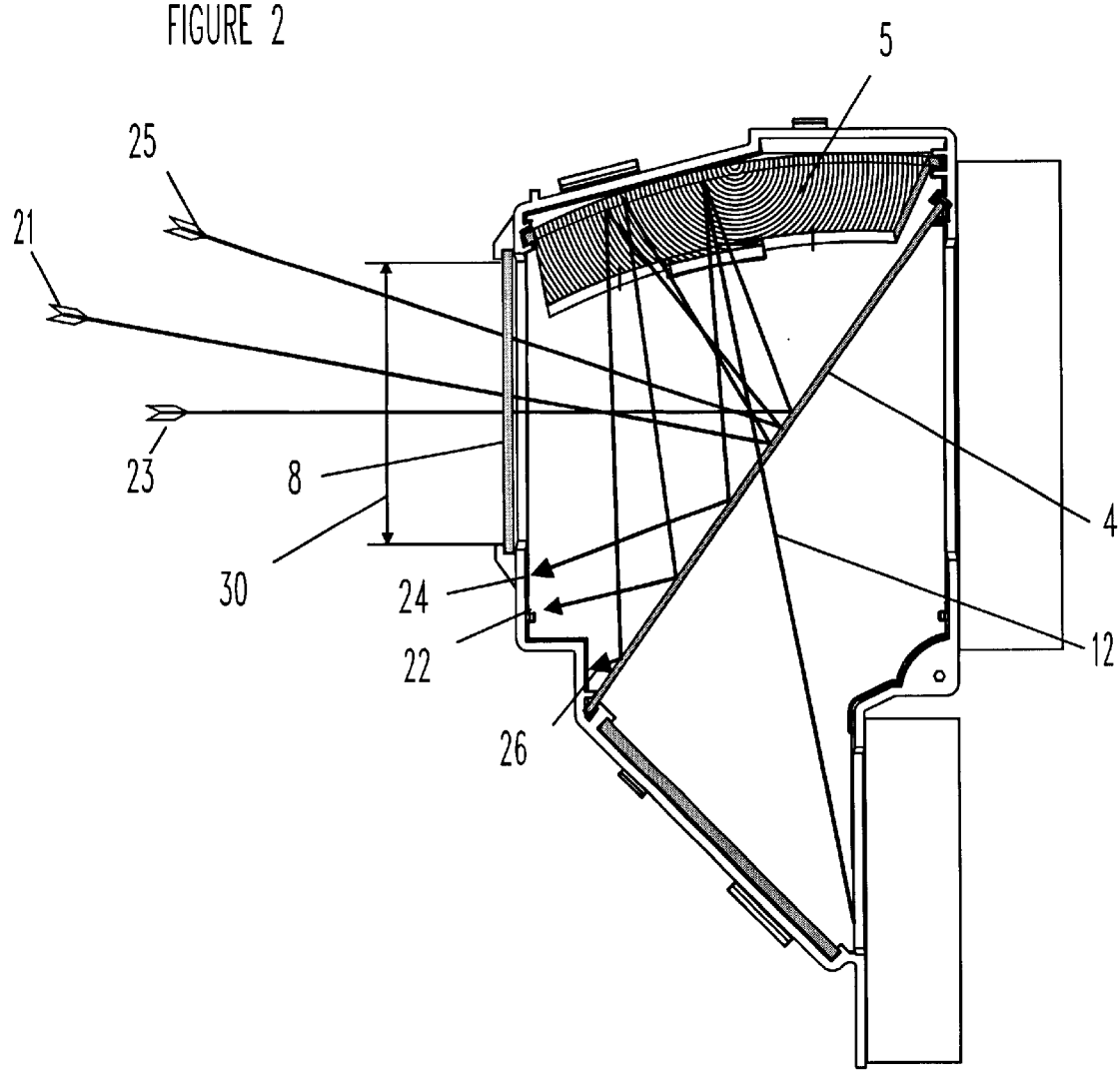
FIG. 2 shows how ghost imaging of light from outside the system of the present invention is blocked from exiting, and therefore is not visible to the viewer.

FIG. 2 shows the ghost imaging of stray light of the system described in FIG. 1. Light from an external source (21) outside the display system enters through the neutral density window, striking the beamsplitter (4), reflecting to the surface of the tilted curved mirror (5). The light is reflected from the curved mirror at a complimentary angle to the axis (12) of the curved mirror, and then reflects again off the surface of the beamsplitter (4). Because the curved mirror (5) is tilted off-axis, the light beam reflecting (22) off the beamsplitter (4) is directed below the window aperture (30), and does not exit the system, therefore, no ghost image is visible.

Figure 3:
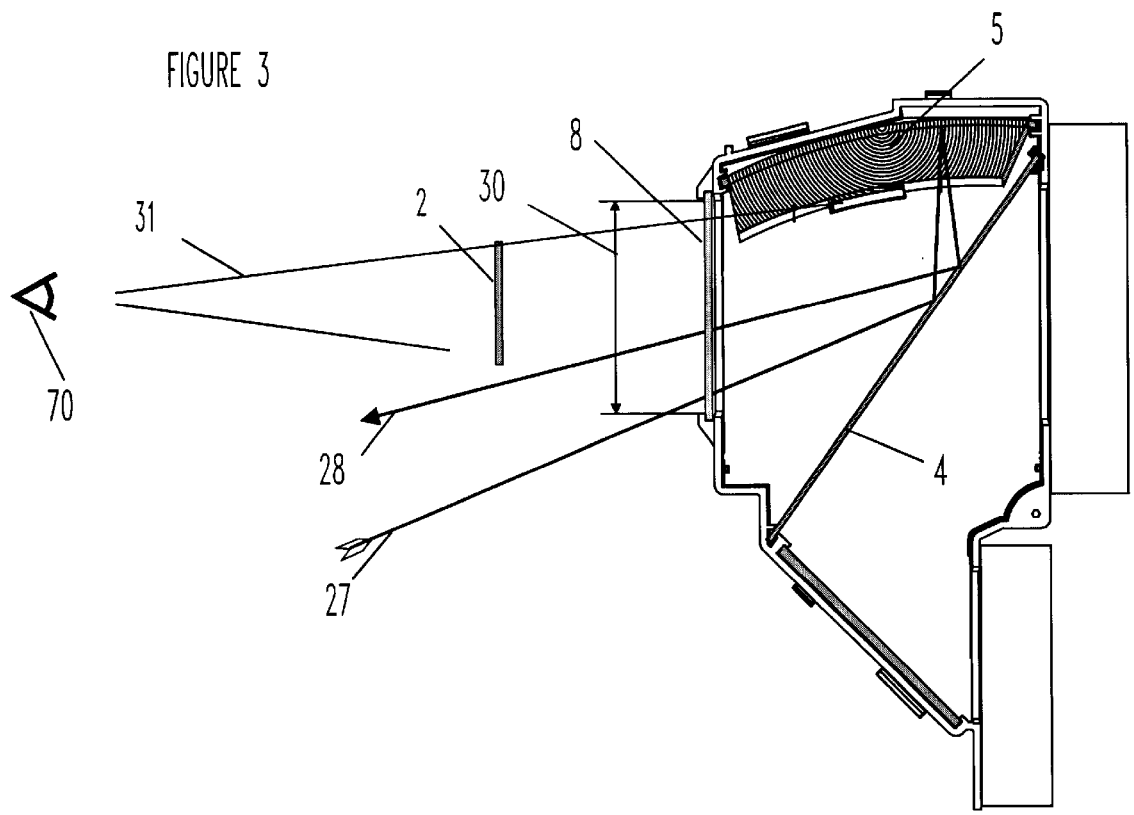
FIG. 3 shows how light entering the window of the system from a source at floor level is imaged outside of the normal view area.

FIG. 3 shows the ghosting created from light sources below the viewing level (70). Light (27) entering the window aperture (30) reflects off the beamsplitter (4), then off the tilted curved mirror (5). The reflected light reflects again off the beamsplitter surface (4) and is directed downward. This reflected light (28) escapes through the window, but can only be seen when viewed at an upward angle. In a small system, it is easier to see these ghosts than in a large system, so the neutral density window (8) is incorporated to reduce the intensity of the ghost image. Light (27) entering through the window (8) is reduced by 30% in brightness, reflects off the beamsplitter, curved mirror, beamsplitter again, and passes again through the window, reducing the ghost brightness by 30% again. When using a neutral density window (8), it is advantageous to incorporate a beamsplitter (4) with a higher ratio of transmission to reflection. Since the target imaging light is both reflected and transmitted by the beamsplitter, the ratio of reflectance to transmission has a small effect on brightness. The ghost imaging light reflects twice off the beamsplitter (4), so a lower reflection to transmission ratio is desirable. For example, use of a 65R/35T beamsplitter (65% transmission, 35% reflection) results in a 22.7% transmission or brightness. It is then reduced by 30% as it exits through the neutral density window (8), resulting in 15.9% image brightness. The ghost imaging light from outside the system (27) passes through the neutral density window (8), resulting in 70% brightness, reflects off the beamsplitter at 35% for 24.5%, reflects again off the beamsplitter (4) at 35%, resulting in 8.57%, and finally exits through the neutral density window (8), resulting in a ghost image intensity of 6%, as compared to the 15.9% real image brightness. This illustration does not account for transmission losses from the curved mirror or glass surfaces, but is intended to explain the principle of ghost reduction through use of a neutral density window.

Figure 4:
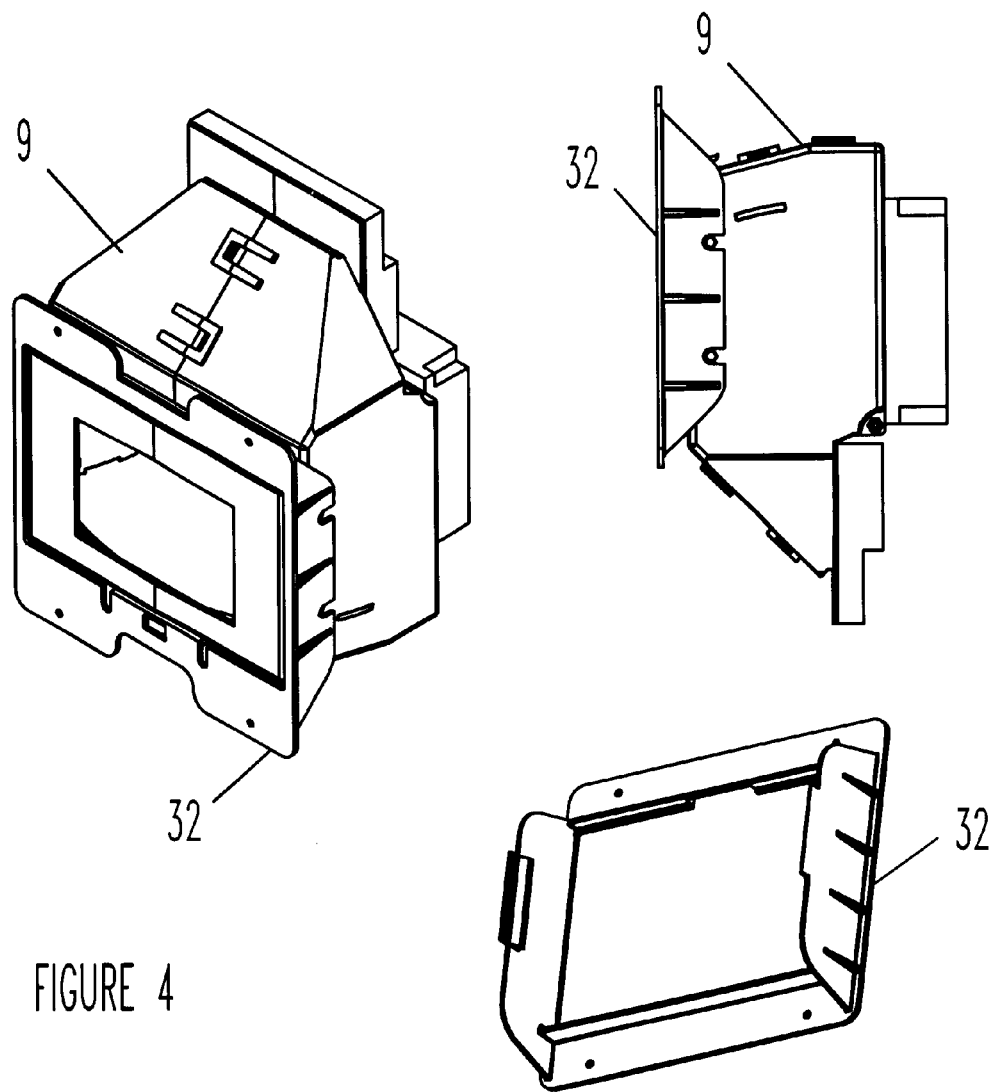
FIG. 4 shows a typical injection molded housing for a small system with mounting flanges.

FIG. 4 shows an example of a real image projection system housing (9) and mounting flange (32) for a small "micro-system". The case housing is designed for injection molding in high volumes, and the flange mounting allows the device to be easily incorporated into OEM equipment, such as vending and ATM machines.

Figure 5:
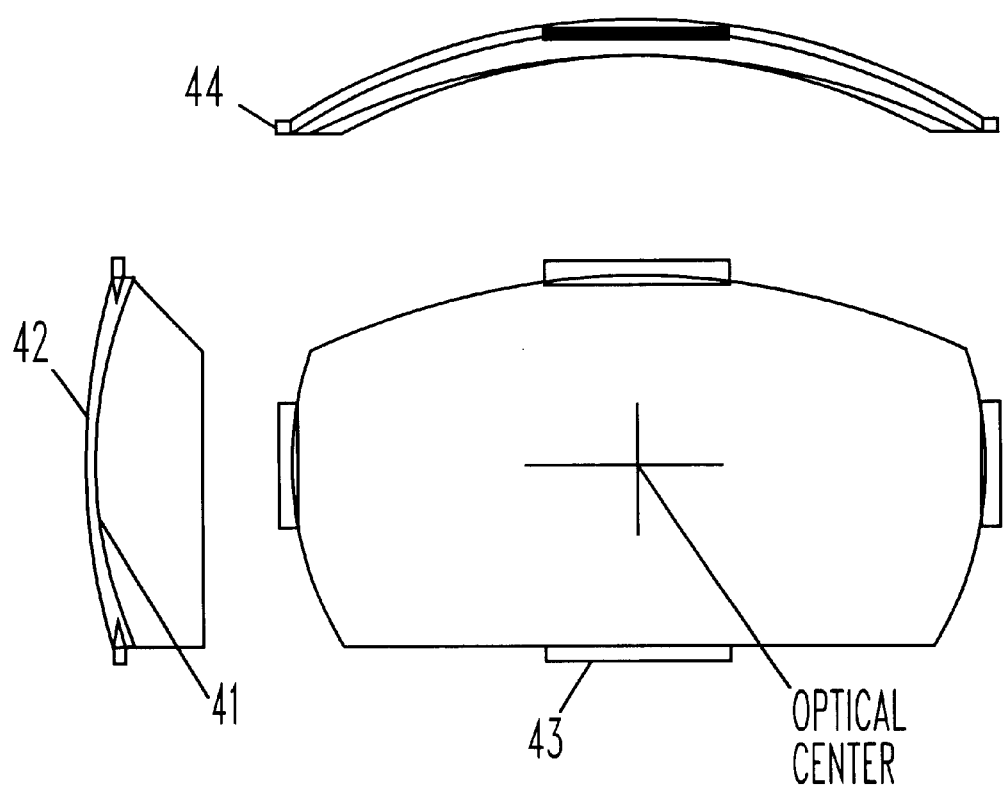
FIG. 5 shows an injected molded curved mirror of two distinct surfaces of revolution, and the mounting tabs necessary for stress-free mounting.

FIG. 5 shows an embodiment of the injection molded mirror used in the micro system of the present invention. The curved mirror has mounting tabs (43,44) on its edges to allow free-floating stress-free mounting in the imaging system. The mirror is fabricated from optical grade acrylic. The material choice is determined by the index of refraction required by the system design. The curved mirror has two distinct surfaces of revolution, one on the convex surface (42), to which the reflective coating is applied, and one surface of revolution on the concave surface (41), which acts as a corrective lens element, for reduction of aberrations and distortion.

There are several combinations of curves or surfaces of revolution that may be incorporated in the mirror, however, the optimum is a spherical surface of revolution on the convex surface (42), and an aspheric surface of revolution on the concave surface (41). In some cases, it is advantageous to have a mirror with two different aspheric surfaces of revolution, depending upon how the system is to be used and the effects of the aberrations created by that application.

Figure 6:
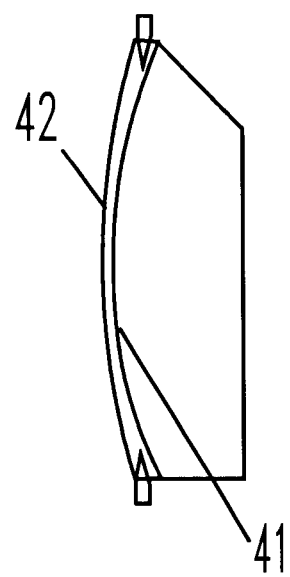
FIG. 6 shows the two surfaces of revolution of the curved mirror of the present invention.
Figure 7:
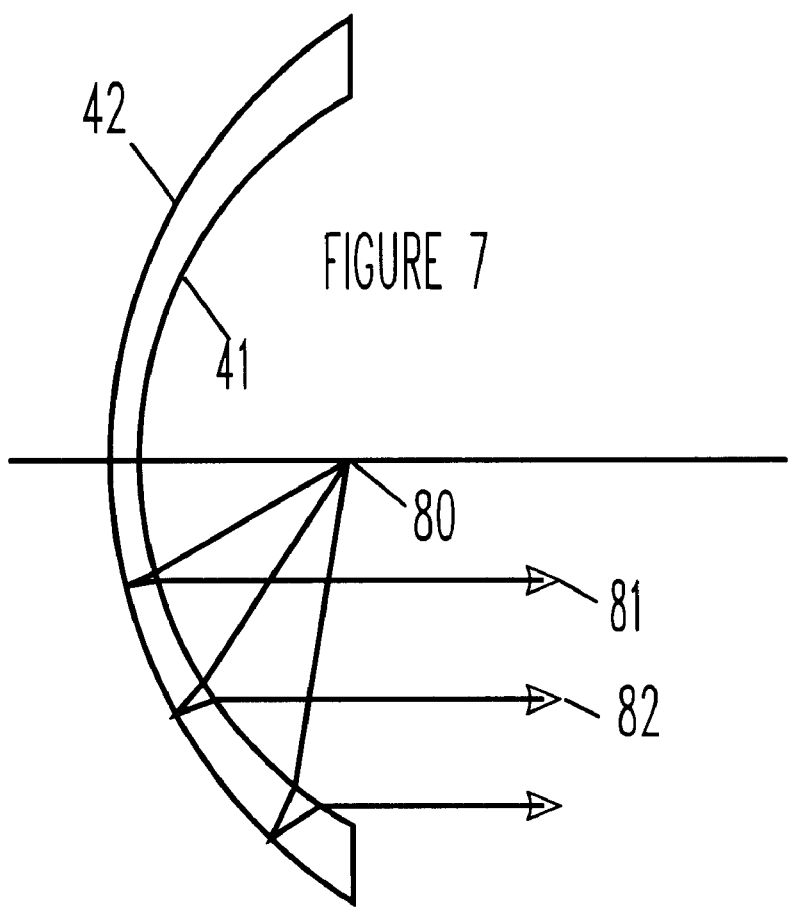
FIG. 7 shows the principles of the Mangin mirror.
Figure 8:
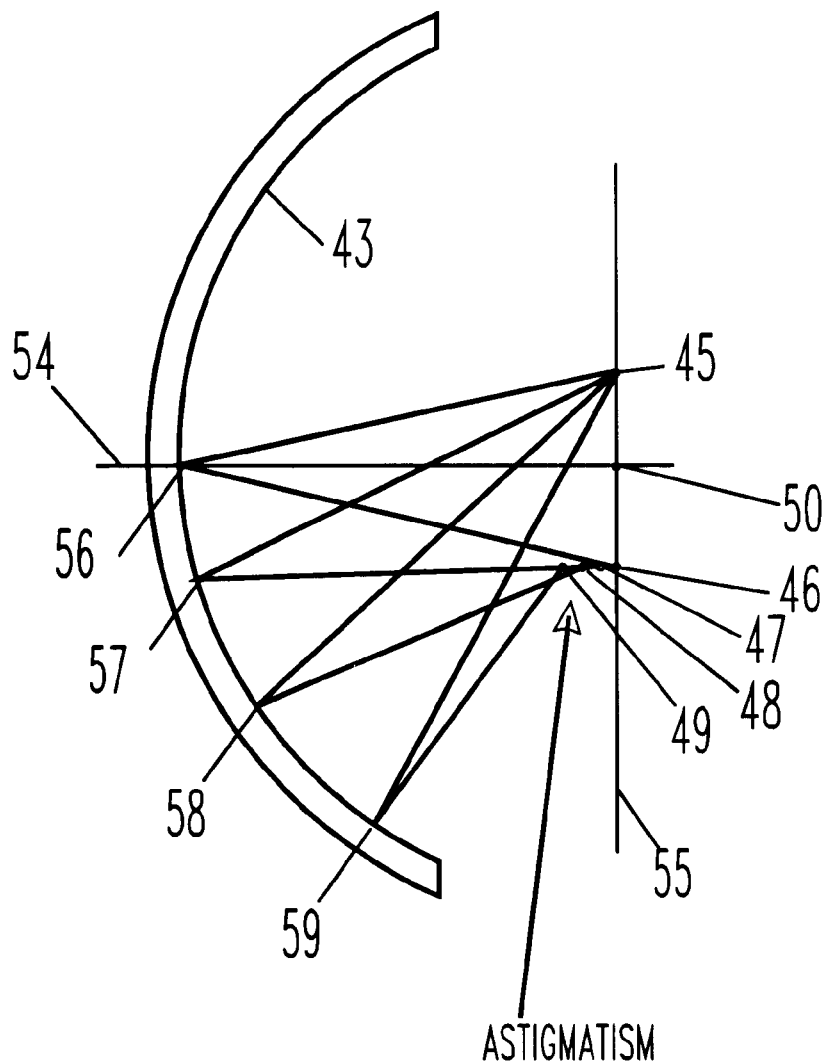
FIG. 8 shows the effects of astigmatism on a normal concave spherical surface of revolution.

FIGS. 6, 7 and 8 show how the two surfaces of revolutions (41,42) can correct the aberrations of an optical system. In FIG. 7, a standard Mangin mirror is depicted. The Mangin mirror has two different spherical surfaces of revolution, having a convex spherical curve of longer radius (42) than the concave spherical curve (41). The concave surface (41) acts as a corrective lens, refracting the light rays to form a collimated beam (81,82) from a light source at the focal point of the system (80). The example shown uses two spherical curves to replicate a function of a single parabolic surface of revolution.

In FIG. 8, a single spherical surface of revolution mirror is depicted with the curve and reflective coating on the concave surface (43). Light emanating from a point (45) offset from the center of curvature (2×focal length) (50) is reflected off the spherical surface (56), and comes to focus at a point (46). Light striking other points on the spherical surface (57,58,59) comes to focus at slightly different points in space (47,48,49). This is a natural phenomenon of a spherical imaging system called astigmatism. Astigmatism can cause significant eyestrain when viewing a system for an extended period of time.

Figure 9:
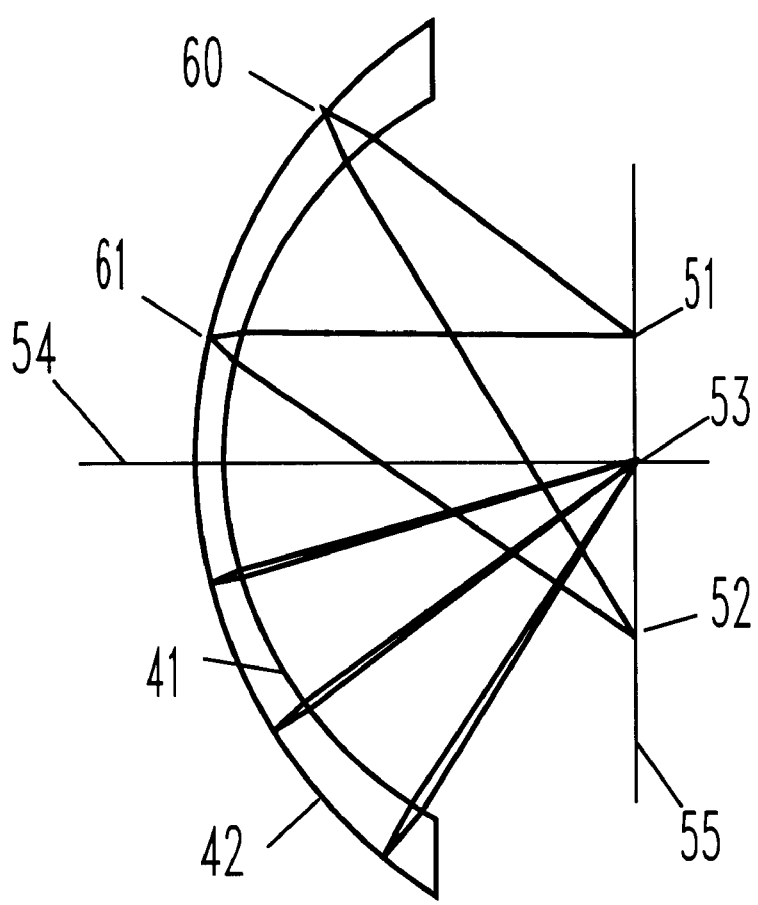
FIG. 9 shows how a Mangin mirror can correct astigmatism.

Since a small real image projection system normally is viewed up close, astigmatism is a significant problem. One method of correcting for astigmatism is to incorporate a corrective lens in the optical path to redirect the reflected rays to a common focus point. The present invention uses a variation of the Mangin mirror concept to correct for the aberrations and astigmatism. Just as the Mangin mirror in FIG. 7 is able to refract the light waves into a collimated beam, the dual surface mirror of the present invention, as described herein, is able to refract light passing through the mirror substrate, and correct the astigmatism of the system. Unlike the Mangin mirror, two spheres would not be effective, however, as shown in FIG. 9, an aspheric surface of revolution on the concave surface (41) can be designed to refract the reflected light rays (60,61) to a common focal point (52). In most cases, the corrections can be incorporated into one aspheric surface of revolution on the concave surface (41), so that a standard spherical surface of revolution can be used for the convex reflective surface (42). In a system such as a video game application, where the real images typically are viewed for relatively long periods of time, it may be necessary to incorporate aspheric surfaces of revolution on both the convex (42) and concave (41) surfaces. This may be necessary in order to create a real image with minimal aberrations, which is necessary for extended periods of viewing without eyestrain.

Figure 10:
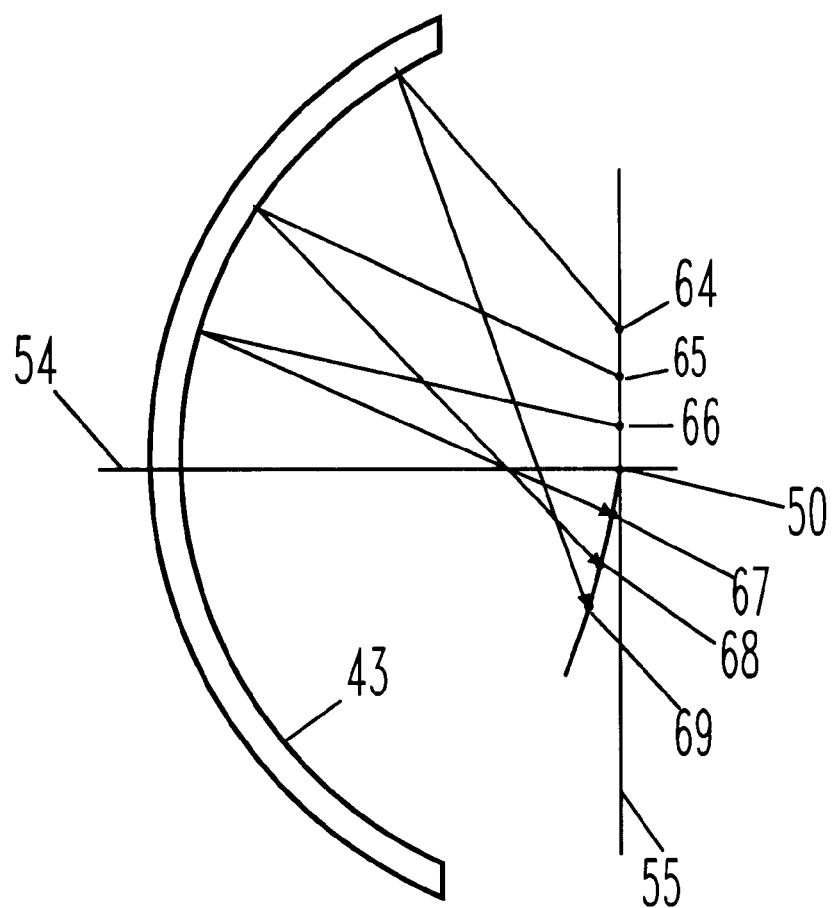
FIG. 10 shows the effects of spherical aberrations and field curvature distortion, when imaging at a point other than the center of the mirror's radius.

FIG. 10 shows the effects of field curvature distortion on a real image. This is a natural phenomenon of spherical optics and visual display systems, and there is no practical way to correct for this, without using an array of corrective lenses. In a commercial real image display system, this is neither practical nor cost effective. When imaging a point (64,65,66) offset from the curved mirror's optical axis (50), the focal points, or points of real image formation (67,68, 69), are not on a straight line or on a plane (55) with the image source points (44,45,46). The effects of field curvature distortion are that the object being imaged is slightly curved, and magnified near the center of the image. The center of the real image projects farther out from the device than the edges of the image (69).

Figure 11:
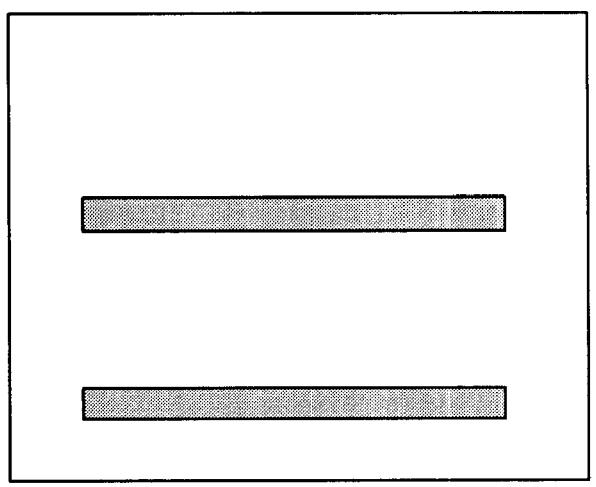
FIG. 11 shows an example of an image on a normal monitor.
Figure 12:
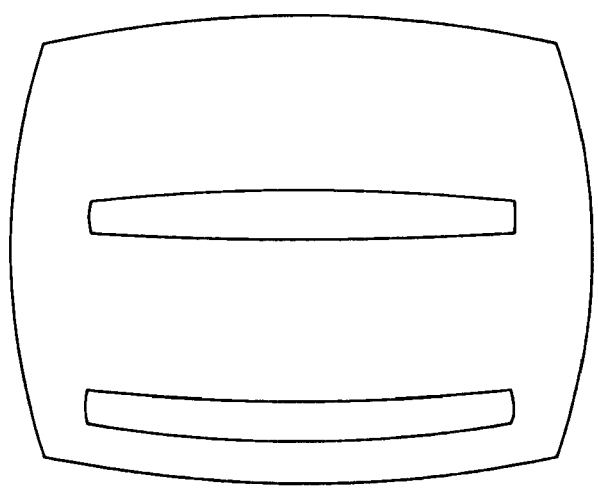
FIG. 12 shows an example of the effect of field curvature distortion on the image created from the target monitor depicted in FIG. 11.

In FIGS. 11 and 12, the effects of field curvature distortion are depicted. FIG. 11 shows a normal CRT screen image displaying two rectangles. FIG. 12 shows the resulting real image created by the system, and the effects of field curvature distortion on the real image; the rectangles are slightly curved, and are magnified in the area near the center of the screen.

Figure 13:
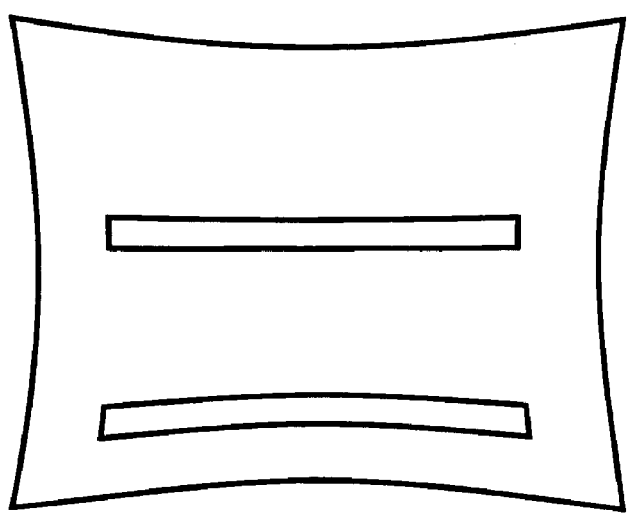
FIG. 13 and FIG. 14 show how a pin-cushioned scene on the monitor or target counteracts the effects of field curvature distortion.
Figure 14:
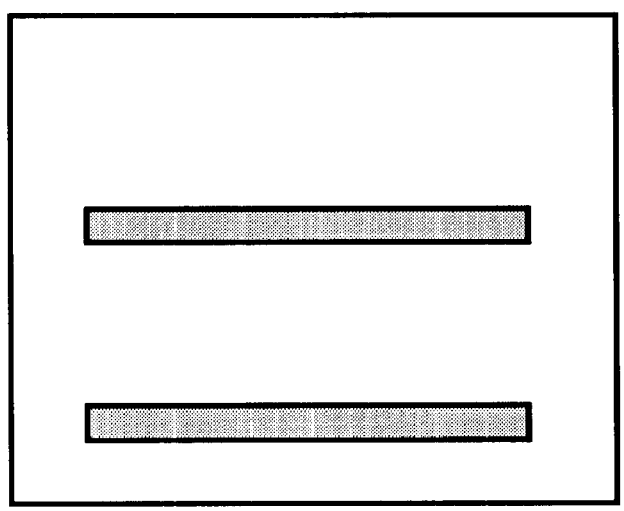

Creating a condition called "pin-cushion" on the CRT screen can compensate for the effects of the field curvature distortion. This can be done electronically, or by distorting the image using software. In a spherical mirror system, the distortion is reasonably symmetrical and round, because of the spherical surface of revolution. The CRT can be adjusted to create a "pin-cushion" image, as shown in FIG. 13. The resulting image, shown in FIG. 14, is a result of correction through field curvature distortion, thus compensating for the distortion.

Figure 15:
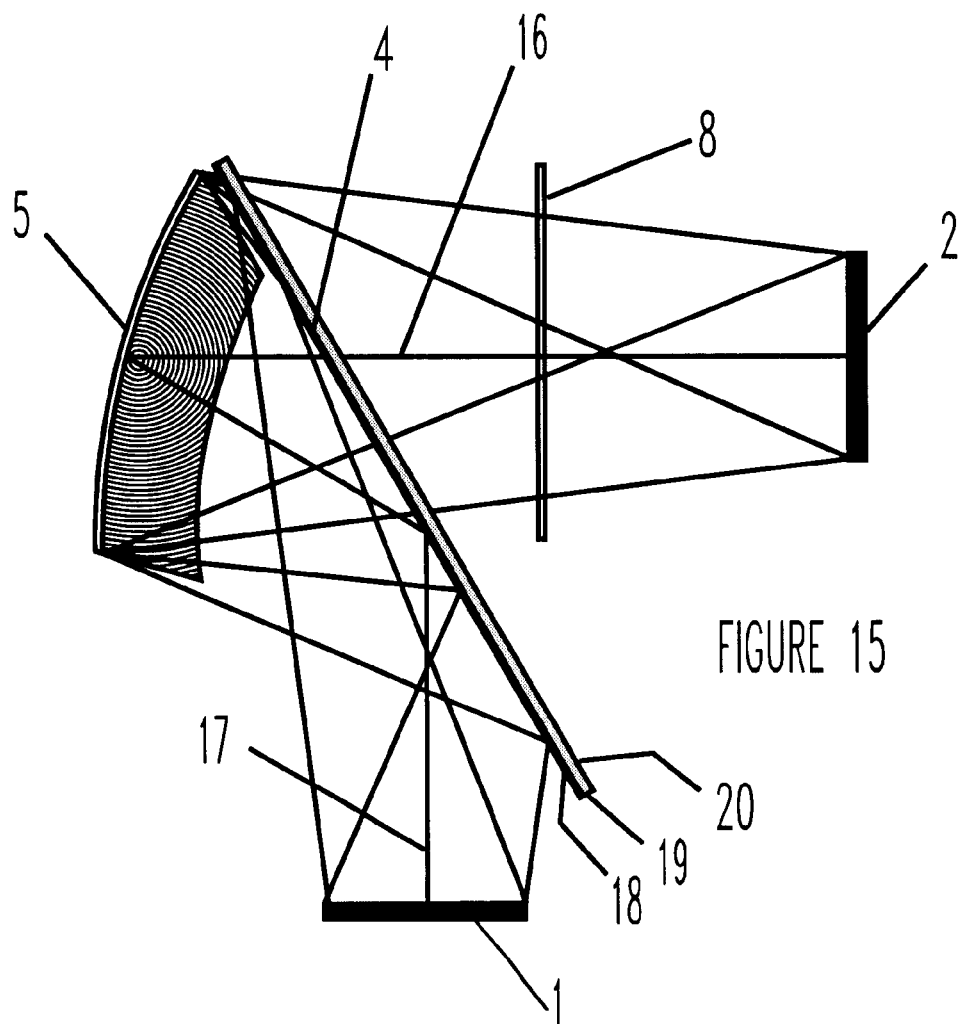
FIG. 15 shows a neutral density beamsplitter used in a tilted off-axis system of the present invention.

The neutral density window of FIG. 3 has another variation possible, when using a different optical configuration. In FIG. 15, the curved mirror (5) is positioned along the viewing axis (16), rather than the target axis (17). In this configuration, the beamsplitter coating (18) is applied to a neutral density glass (19) or substrate. The beamsplitter coating (18) is applied to the beamsplitter (4) surface facing the curved mirror (5). Light from the target object (1) reflects off the beamsplitter coating (18) without passing through the neutral density material (19). Light from outside the system passes through the neutral density material twice, and therefore, the intensity of ghost imaging light is significantly reduced.

Figure 16:
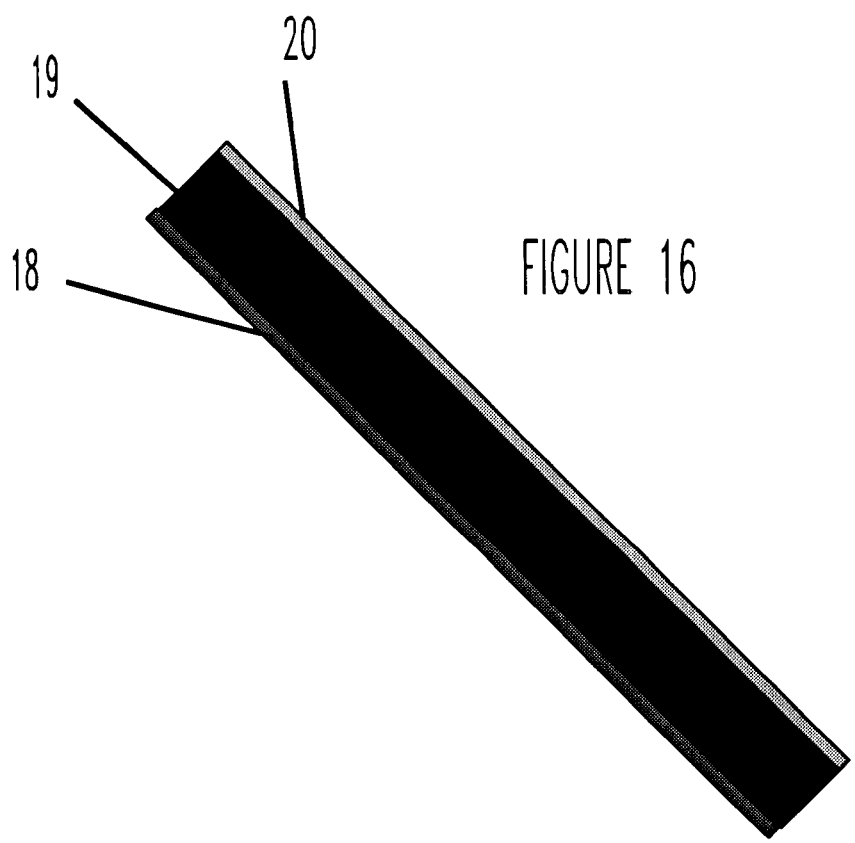
FIG. 16 shows an optional neutral density coating on the back surface of the beamsplitter.

FIG. 16 shows a variation of the neutral density beamsplitter, whereby a neutral density coating (20) is applied to the surface of a clear substrate (19) and a beamsplitter coating (18) is then applied to the opposite surface. In either configuration, an anti-reflective coating optionally is applied over the neutral density coating (20), or on the side of the neutral density substrate (19) opposite the beamsplitter coating (18).

Figure 17:
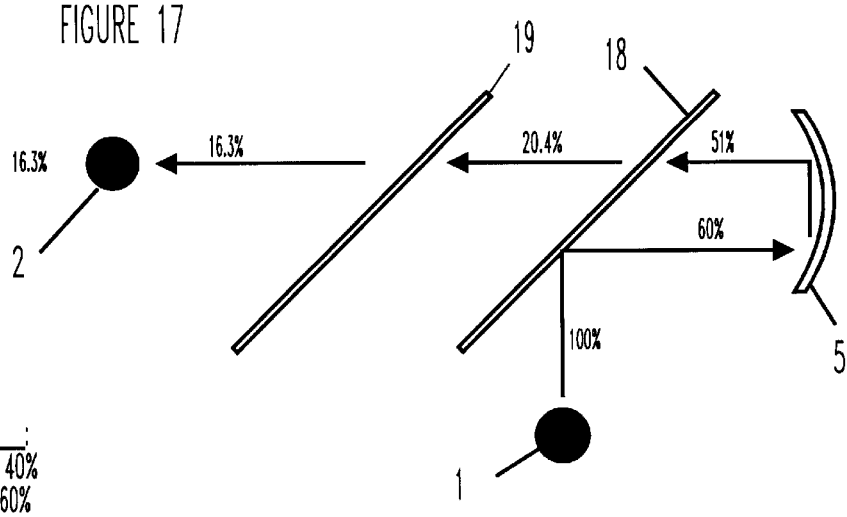
FIG. 17 shows the imaging beam-path of the tilted-neutral density system and corresponding transmission rates for the components.

FIG. 17 shows the transmission characteristics of a system using a 20% absorptive neutral density substrate (19) beamsplitter, a 60% reflective/40% transmissive beamsplitter coating (18), and an 85% reflective curved mirror (5). The resulting real image (2) intensity is 16.3% of the original object's (1) light intensity.

Figure 18:
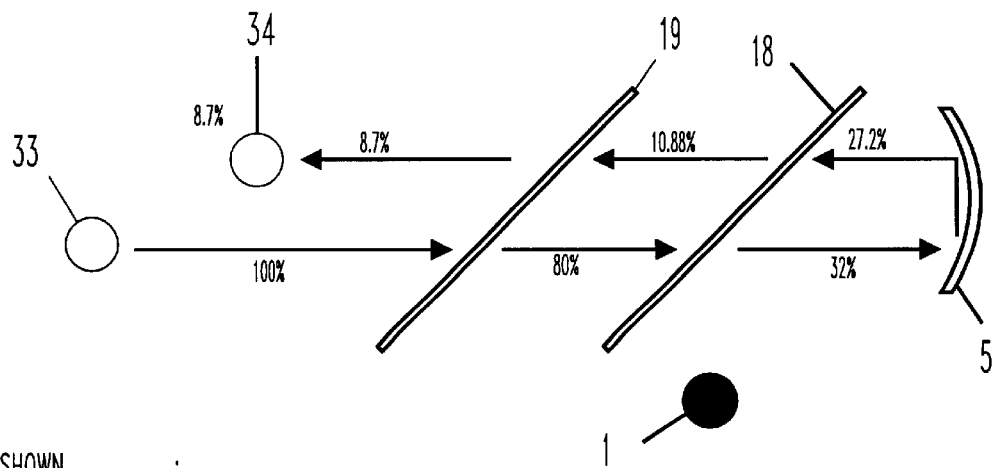
FIG. 18 shows the ghost beam-path of the tilted-neutral density system and corresponding transmission rates for the components.

FIG. 18 shows the transmission characteristics of ghost imaging light emanating from outside (33) the same system depicted in FIG. 17. The ghost image (34) exits the system at an intensity of 8.7%, compared to 16.3% for the real image. The example shown includes a 60R/40T beamsplitter and 20% absorptive neutral density beamsplitter. Other combinations that offer different performance characteristics.

FIG. 19 is a chart of the effects of different combinations of beamsplitter and neutral density absorption. As one will see from the chart, that ghost reduction is achieved at the cost of image brightness, and a balance should be maintained, based of the particular application. Another consideration as to the need for ghost reduction is the required view angle. The tilted mirror system totally eliminates ghost imaging, when viewed within a reasonable angle of incidence vertically. Ghost imaging is only visible when viewing the system from below the normal view axis.

Figure 20:
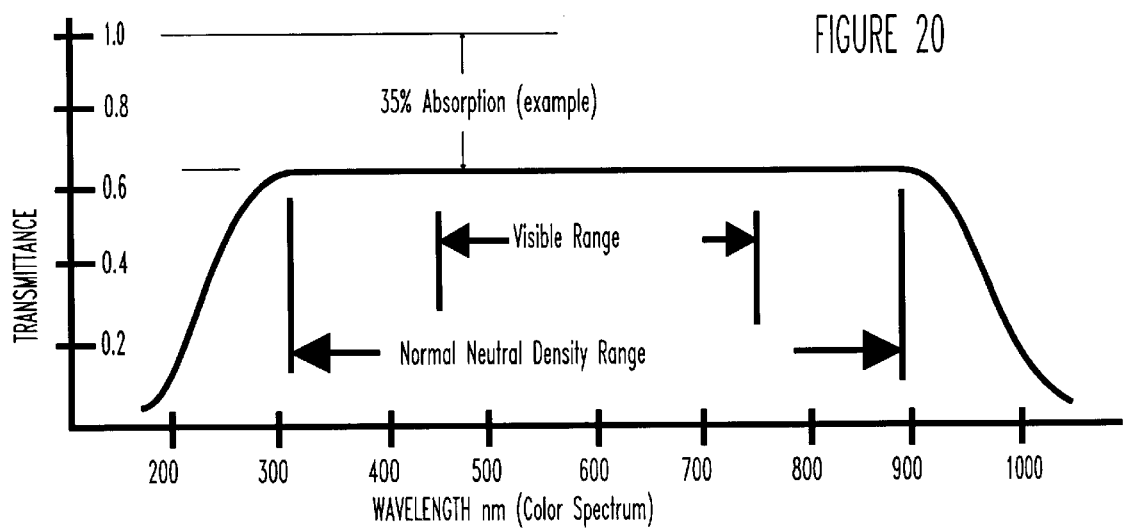
FIG. 20 shows a spectrograph of a neutral density material used in the system of the present invention, and the relatively even transmission rates across the visual color spectrum.

FIG. 20 shows a spectrograph of a neutral density window having 35% absorption. The absorption is relatively uniform across the visible color spectrum, and begins to drop off in the UV and IR range. The value of a neutral density window is that all colors are absorbed uniformly across the visible spectrum, therefore the real image is a true-color replication of the original object.

Figure 21:
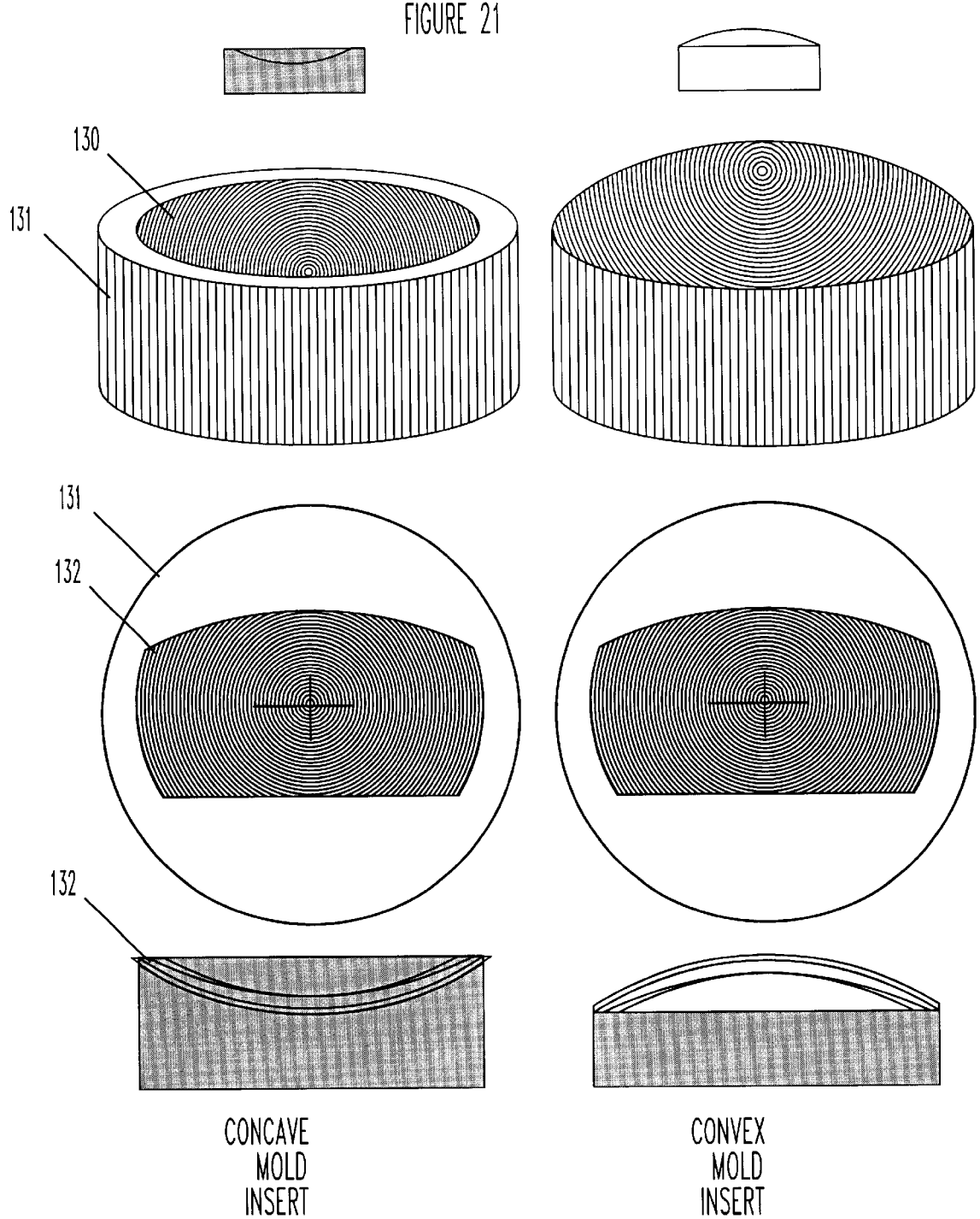
FIG. 21 shows the tooling insert method for precision polishing injection molding of mirrors.

FIG. 21 depicts the process of fabricating an aspheric mold. The aspheric curve (130) is diamond-turned into the steel mold blank (131). Once the curve is cut using single point diamond-turning, the surface of revolution (130) is then polished to an extremely fine finish, using a custom polishing head (see FIG. 22). The polished mold (131) is then cut, using a wire-saw and/or EDM process, into a rectangular design, forming a mold insert (132).

Figure 22:
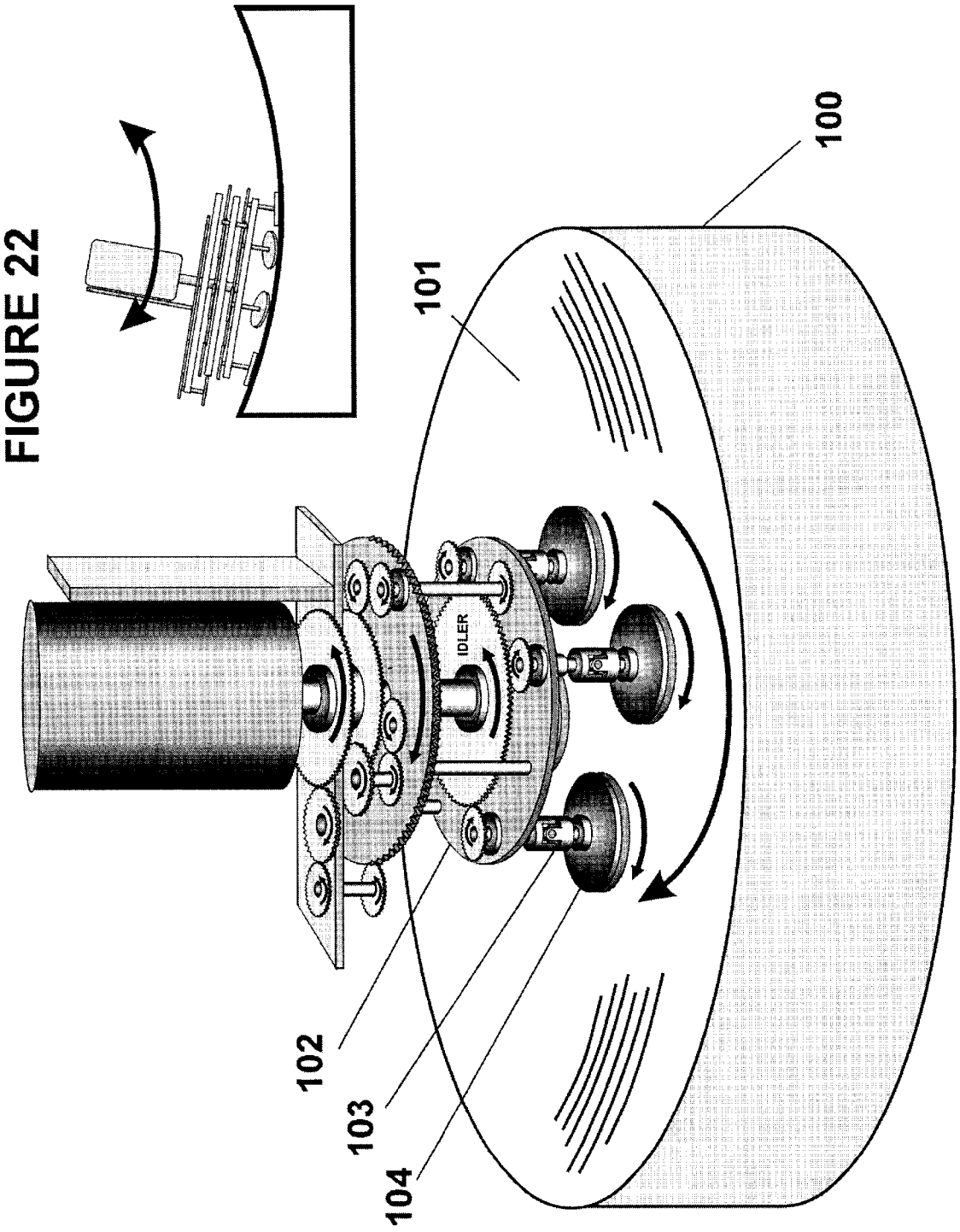
FIG. 22 shows a specialized lapping and polishing head for precision polishing of the mirror mold's aspheric surface of revolution.

FIG. 22 shows an example of a spider-style-polishing spindle for precision lapping and polishing of aspherical surfaces of revolution. An aspheric surface of revolution does not have a uniform change of slope. It may vary substantially at various points along the surface. Standard polishing techniques are only effective for spherical surfaces of revolution, and bar style polishers are suited for parabolic curves. Neither method is acceptable for aspherical surfaces of revolution. A polishing head must be fabricated with individual "floating" polishing heads (104). The polishing heads (104) are powered and conform to the aspheric surface with universal couplers (103). A series of gear drives are used to rotate each polishing head (104), and simultaneously rotate the entire assembly (102). This method ensures uniform material removal across the surface of the aspheric surface of revolution, ensuring a precision injection molded mirror surface.

Figure 23:
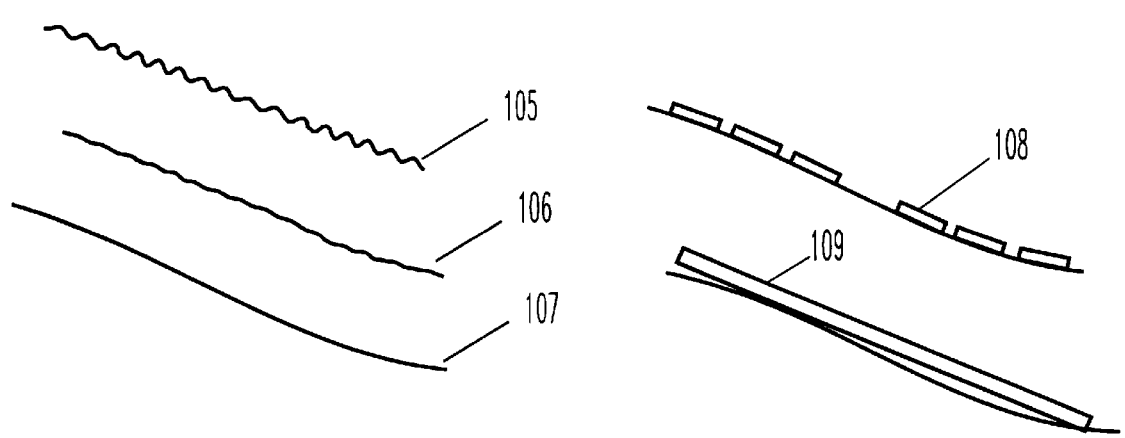
FIG. 23 shows how a spider style polishing tool polishes the diamond-turned mold, without distorting the aspheric surface of revolution.

FIG. 23 shows a graphic representation of the quality of surface of revolution of an asphere. The diamond-turned surface, although extremely smooth in appearance, is actually comprised of turning rings (105) from the diamond lathe operation. The surface requires lapping with a polishing compound to smooth out the grooves (106). After lapping, the surface is polished with cerium oxide or fine optical rouge, to create a precision surface of revolution (107). The aspheric surface curvature cannot be polished with a standard spherical tool, because the surface contact would be uneven (109) and would ultimately change the desired curve to a curve that is not acceptable. The spider tool depicted in FIG. 22 conforms (108) to the aspheric curve, and causes minimal distortion to the desired surface of revolution.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A real image projection system, comprising:
   a) a curved mirror, mounted with an optical axis of said curved mirror at a tilted angle, relative to an imaging axis of said image projection system; and
   b) a target object positioned below said curved mirror, facing toward a front of said image projection system, wherein said target object is selected from the group consisting of a real object, a graphic image, a video image, and any object that reflects, transmits, or emits light; and
   c) a flat fold mirror or reflector positioned below a viewing window of said image projection system wherein a reflective surface of said flat fold mirror or reflector faces toward said curved mirror and toward said target object, said flat fold mirror or reflector being positioned at an angle such that a target beampath is reflected at a complimentary angle from said target object to said fold mirror to said curved mirror, striking a center or vertex of said curved mirror at an angle equal to twice the angle of tilt of said curved mirror relative to said imaging axis; and
   d) a clear reflective substrate, selected from the group consisting of glass, plastic, mylar, and any transparent material that has a reflectivity of between about 3% and 5% on a front surface thereof, and having a rear surface coated with an anti-reflective coating resulting in between about 0.5% and 1% reflectivity, said clear reflective substrate being positioned at an inclined angle with said clear surface facing an observer, a top edge of said substrate being nearest to said curved minor and a bottom edge of said substrate being located directly over said fold mirror, such that a beamsplitter does not intersect the target beampath from said target object to said fold mirror to said curved mirror; and
   e) a secondary image source comprising a monitor, video image, static image, or real object positioned directly overhead of said clear reflective substrate, such that light from said secondary image source is reflected along an image path, forming a virtual image directly behind said real image; and
   f) a neutral density window or circular polarizer window positioned along said imaging axis of said system, wherein said neutral density filter comprises a neutral density material, or a neutral density coating, wherein light transmitting through said filter is partially absorbed in near equal amounts across the visible light spectrum.

* * * * *